United States Patent
Turner et al.

(10) Patent No.: US 8,526,824 B1
(45) Date of Patent: Sep. 3, 2013

(54) CORRELATION SYSTEMS AND METHODS WITH ERROR COMPENSATION

(75) Inventors: Michael D. Turner, Huntsville, AL (US); Leif J. Sandstrom, Madison, AL (US); John Gordon Brooks, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 231 days.

(21) Appl. No.: 13/218,204

(22) Filed: Aug. 25, 2011

Related U.S. Application Data

(60) Provisional application No. 61/454,725, filed on Mar. 21, 2011.

(51) Int. Cl.
*H04B 17/00* (2006.01)
*H04B 10/00* (2013.01)
*G01R 29/26* (2006.01)

(52) U.S. Cl.
USPC ............... 398/158; 398/9; 398/16; 398/33; 702/71

(58) Field of Classification Search
USPC ................................ 398/158, 33
See application file for complete search history.

(56) References Cited

U.S. PATENT DOCUMENTS

| | | | |
|---|---|---|---|
| 5,353,110 A * | 10/1994 | Jones | ............... 356/73.1 |
| 5,450,191 A | 9/1995 | Parks et al. | |
| 5,479,251 A | 12/1995 | Hanson | |
| 5,694,389 A * | 12/1997 | Seki et al. | ............... 370/208 |
| 5,825,516 A | 10/1998 | Walsh | |
| 5,850,479 A | 12/1998 | Terry et al. | |
| 6,028,661 A | 2/2000 | Minami et al. | |
| 6,046,797 A | 4/2000 | Spencer et al. | |
| 6,122,044 A | 9/2000 | Gautheron et al. | |
| 6,882,410 B2 | 4/2005 | Asahina et al. | |
| 6,934,655 B2 * | 8/2005 | Jones et al. | ............... 702/108 |
| 7,075,632 B1 * | 7/2006 | Asher et al. | ............... 356/73.1 |
| 7,126,678 B2 | 10/2006 | Fayolle et al. | |
| 7,280,188 B2 | 10/2007 | Schmuck et al. | |
| 7,317,874 B2 | 1/2008 | Li et al. | |

(Continued)

FOREIGN PATENT DOCUMENTS

| | | |
|---|---|---|
| EP | 1748580 A1 | 7/2005 |
| EP | 1632766 A1 | 3/2006 |

(Continued)

OTHER PUBLICATIONS

Shim et al; Correlation-based OTDR for in-service monitoring of 64-split TDM PON; Feb. 2012; optical society of America; pp. 4921-4926.*

(Continued)

*Primary Examiner* — Kenneth N Vanderpuye
*Assistant Examiner* — Amritbir Sandhu
(74) *Attorney, Agent, or Firm* — Maynard Cooper & Gale, P.C.; Jon E. Holland

(57) ABSTRACT

A correlation system, such as a correlation optical time domain reflectometer (OTDR) system, transmits a correlation sequence, such as an M-sequence, and measures the returns of the correlation sequence over time. The system correlates the transmitted sequence with the returns to provide correlation measurement values that respectively correspond to different distances from the point of transmission. A correlation error compensation element adjusts each correlation measurement value in order to cancel the contribution of the correlation error floor from the measurements to provide compensated measurement values that are substantially free of the effects of the correlation error floor.

22 Claims, 9 Drawing Sheets

(56) References Cited

U.S. PATENT DOCUMENTS

| | | |
|---|---|---|
| 7,440,701 B2 | 10/2008 | Li et al. |
| 7,450,848 B2 | 11/2008 | Li et al. |
| 7,493,042 B2 | 2/2009 | Li et al. |
| 7,620,319 B2 * | 11/2009 | Krimmel ................. 398/33 |
| 8,005,358 B2 * | 8/2011 | Zhang et al. ............. 398/16 |
| 8,009,981 B2 * | 8/2011 | Swenson et al. .......... 398/16 |
| 8,160,187 B1 * | 4/2012 | Turner et al. ............ 375/346 |
| 8,406,620 B2 * | 3/2013 | Khermosh et al. ........ 398/16 |
| 2002/0161542 A1 | 10/2002 | Jones et al. |
| 2003/0081198 A1 | 5/2003 | Bonja |
| 2004/0047629 A1 * | 3/2004 | Evangelides et al. ....... 398/33 |
| 2006/0029390 A1 * | 2/2006 | Schmuck et al. .......... 398/33 |
| 2006/0133806 A1 * | 6/2006 | Krimmel ................. 398/33 |
| 2008/0077343 A1 * | 3/2008 | Johansson ............... 702/71 |
| 2008/0085114 A1 * | 4/2008 | Nakajima et al. ......... 398/33 |
| 2009/0027656 A1 * | 1/2009 | Zhang et al. ............. 356/73 |
| 2009/0074117 A1 * | 3/2009 | Fujita et al. ............. 375/343 |
| 2009/0257743 A1 | 10/2009 | Chung et al. |
| 2010/0092182 A1 * | 4/2010 | Sarchi et al. ............. 398/168 |
| 2010/0290035 A1 * | 11/2010 | Wang et al. .............. 356/73.1 |
| 2010/0328651 A1 * | 12/2010 | Gaspari ................... 356/73.1 |
| 2011/0013904 A1 * | 1/2011 | Khermosh et al. ........ 398/16 |
| 2011/0026872 A1 * | 2/2011 | Davies et al. ............ 385/12 |
| 2011/0200338 A1 * | 8/2011 | Yokoi ..................... 398/158 |
| 2012/0051742 A1 * | 3/2012 | Li et al. .................. 398/38 |
| 2013/0077975 A1 * | 3/2013 | Dvir et al. ............... 398/66 |

FOREIGN PATENT DOCUMENTS

| | | |
|---|---|---|
| EP | 1884758 A1 | 3/2006 |
| EP | 1901448 A1 | 9/2006 |
| EP | 1986350 A1 | 4/2007 |
| EP | 1524781 B1 | 10/2007 |
| EP | 1675280 B1 | 11/2007 |

OTHER PUBLICATIONS

Biain et al; New technique for nonintrusive OTDR based on traffic data correlation; Aug. 1994; Electronics letters vol. 30 No. 17; pp. 1443-1444.*

Zhi et al; Research on COTDR for measuring distributed temperature and strain; 2011; IEEE; pp. 590-593.*

Gong et al; Noise analysis on a correlation OTDR1996; pp. 170-172.*

Johansson et al; correlation based approach to fiber reflectometry using commmercial off the shelf components; 2006; IEEE; pp. 36-37.*

Takushima et al; Optical reflectometry based on correlation detection and its application to the in-service monitoring of WDM passive optical network; 2007; Optical society of America; pp. 5318-5326.*

Sischka, et al., "Complimentary Correlation Optical Time-Domain Reflectometry—in respect to the HP 8145A Optical Time-Domain Reflectometer—technical," Hewlett-Packard Journal, Dec. 1988, p. 14-21.

Takushima, et al. "In-Service OTDR for Passive Optical Networks," OSA/OFC/NFOEC, 2010.

Turner, et al, U.S. Appl. No. 12/783,999 entitled, "Systems and Methods for Unobtrusively Testing Optical Fibers," filed May 20, 2010.

* cited by examiner

CORRELATION SYSTEMS AND METHODS WITH ERROR COMPENSATION

CROSS REFERENCE TO RELATED APPLICATION

This application claims priority to U.S. Provisional Patent Application No. 61/454,725, entitled "OTDR Correlation Compensation Systems and Methods" and filed on Mar. 21, 2011, which is incorporated herein by reference.

RELATED ART

In fiber-optic communication systems, optical signals are used to carry data sometimes across great distances. It is well known that optical signals typically provide significantly higher data rates than those enabled by electrical signals. However, anomalies along an optical fiber, such as degraded splices, can adversely affect the performance of optical communication. Thus, techniques have been developed to locate fiber anomalies so that the anomalies can be repaired in order to improve communication performance.

In particular, optical time domain reflectometers (OTDRs) for detecting optical fiber anomalies have been developed and successfully used. One type of OTDR transmits a pulse along an optical fiber. A portion of the light of the pulse is returned toward the transmitter from each point along the optical fiber. As will be well known to those skilled in the art, such returns are produced by scattering of the light (Rayleigh backscatter) all along length of the fiber and in some cases by localized reflections (Fresnel reflections) at particular points along the fiber. Herein, both these sorts of optical signal returns are collectively referred to as reflections. At an anomaly, such as a degraded splice, more attenuation may occur as light passes through the splice, and in some cases more light may be reflected at this point than at other points that are free of anomalies. The OTDR measures the light returned from points along the length of the fiber and detects anomalies based on the reflected light.

Further, the OTDR can also estimate the location of the detected anomaly based on reflection delay. In this regard, each point along the optical fiber corresponds to a particular delay measured from the time of transmission by the OTDR. That is, the further the location is from the OTDR, the longer it will take for a transmitted pulse to reach the location, reflect, and return to the OTDR. Thus, the OTDR measures the amount of delay between transmission of the pulse and reception of a reflection that may indicate the presence of an anomaly. The delay corresponds to the distance of an anomaly from the OTDR, and the OTDR estimates the distance of the detected anomaly from the OTDR based on such delay.

Unfortunately, there are several significant drawbacks associated with the foregoing OTDR. In particular, data is not transmitted across the optical fiber during testing. Thus, continuous monitoring of the optical fiber is not enabled. In addition, a trade-off exists between resolution and range. In this regard, for better resolution, a more narrow pulse is desired. However, the signal is attenuated as it travels along the optical fiber, and the range of the pulse is limited. A wider pulse of any given amplitude has more light energy and, therefore, a longer range but degrades resolution.

In another type of OTDR, often referred to as a correlation OTDR, there is less of a trade-off between resolution and range because in these systems the parameter that controls range can be varied independently from the parameter that affects resolution. In a correlation OTDR, a pseudo noise (PN) sequence is transmitted along the optical fiber instead of a pulse. The PN sequence that reflects from the optical fiber is correlated with a delayed version of the transmitted PN sequence.

In this regard, the reflected PN sequence and delayed PN sequence are input into a bank of correlators for which each correlator corresponds to a discrete delay and, hence, location on the fiber. The delayed PN sequence is stepped through a delay line, and for each step, each correlator correlates (i.e., multiplies and accumulates) a respective value of the delayed PN sequence with the value of the reflected PN sequence currently received from the fiber thereby outputting a correlation value indicating to what degree the two sequences match.

The delay is controlled such that a given correlator receives a value of the delayed PN sequence when a reflection of that value would be received from the fiber location corresponding to the correlator. Accordingly, PN sequence values received from fiber locations with delays that do not correspond to a given correlator vary relative to the values from the delayed PN sequence such that the correlation values are substantially canceled by the accumulation process. However, reflected PN sequence values received from the location with a delay which does correspond to that correlator respectively match the values from the delayed PN sequence such that the correlation values accumulate to a significant number over time.

Therefore, each correlator provides an output indicative of the light reflected from a given point on the fiber and substantially independent of light reflected from other locations along the fiber. If a correlator provides an output value which is significantly different from the value that would be expected for a fiber with no anomaly at that location, then it can be determined that an anomaly likely exists at the fiber location corresponding to the correlator.

In general, light is attenuated as it propagates along a fiber, and the light reflected from points along the fiber farther away from a correlation OTDR is attenuated to a greater extent than light reflected from points close to the correlation OTDR. FIG. 1 depicts an exemplary graph of theoretical optical path loss versus distance for the returns measured by a correlation OTDR. Due to line attenuation, the curve has a linear negative slope indicating that there is greater optical path loss for the returns from points farther from the correlation OTDR. However, in practice, there is a correlation error floor that further degrades signal quality, particularly for returns farther from the correlation OTDR.

In this regard, in a correlation OTDR, every received return sample is essentially a composite signal made up of contributions returned from locations along the entire length of the fiber. At any given correlator, only one component of the signal is associated with the return from the corresponding fiber location. The other components are associated with other fiber locations, and these other components combine to distort the return sample from its ideal value. The error resulting from the presence of these other components is referred to as the correlation error floor. The contributions produced by these other components are scaled by $-1/N$, where N is the bit length of the PN sequence, and the correlation error floor represents a negative contribution to the measurement. Due to the attenuation effects described above, the correlation error floor becomes more pronounced at points along the fiber further from the correlation OTDR where the optical path loss is higher. Thus, for fibers of short length, the effects of the correlation error floor may not be significant, but the correlation error floor is a more significant error source for fibers of longer length.

Indeed, FIG. 2 depicts the graph of FIG. 1 after the curve has been adjusted to account for the effects of the correlation error floor. As can be seen, the curve remains essentially linear for points close to the correlation OTDR where the correlation error floor is not significant relative to the signal level of the returns from those points. However, for points farther from the correlation OTDR, the curve begins to "droop." That is, the magnitude of the slope gradually increases in a non-linear fashion with distance such that there is significantly more optical path loss for points farther from the correlation OTDR relative to the linear curve shown by FIG. 1.

Conventionally, this droop has been addressed for long fibers by increasing N, the length of the PN sequence, thereby lowering the correlation error floor. In this regard, as indicated above, contributions produced by the components causing the correlation error floor are scaled by –1/N such that an increase in N should reduce the effect of the correlation error floor on the measurement. However, increasing N also undesirably increases the time required for the correlation OTDR to complete a measurement for all points along the fiber. Indeed, for long fibers, maintaining the desired stability from the effects of direct current (DC) bias drift, baseline wander, and variations in laser power output for the duration of the measurement may be problematic for large values of N.

Thus, it generally would be desirable to remove the correlation error floor from the correlation values so that the effects of the correlation error floor can be compensated without having to increase N. However, using conventional filtering and/or noise cancellation algorithms can be problematic. Indeed, analyzing the correlation measurements mathematically in order to determine the effect of the correlation error floor and cancel it from the correlation values can be complex and, in some cases, require the inversion of very large matrices. Thus, circuitry for canceling the effects of the correlation error floor from the correlation values can be complex and expensive.

Accordingly, a heretofore unaddressed need exists in the industry for correlation systems and methods that compensate for the effects of the correlation error floor without requiring the length of the PN sequence to be increased. It is generally desirable for the circuitry implementing such compensation to be relatively simple and inexpensive.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to correlation systems and methods, such as correlation optical time domain reflectometer (OTDR) systems, that compensate for error from the correlation error floor. In one exemplary embodiment, a correlation system transmits a correlation sequence, such as an M-sequence or other type of pseudo noise (PN) sequence, and measures the returns of the correlation sequence over time. The system correlates the transmitted sequence with the returns to provide correlation measurement values that respectively correspond to different distances from the point of transmission. A correlation error compensation element adjusts the correlation measurement values in order to cancel the contribution of the correlation error floor from the measurements to provide compensated measurement values that are substantially free of the effects of the correlation error floor.

In one exemplary embodiment, the algorithm for adjusting the correlation measurement values can be implemented via relatively simple and inexpensive circuitry. Moreover, by removing the effects of the correlation error floor from the correlation measurements, it is unnecessary to increase the length of the correlation sequence (e.g., M-sequence) due to the correlation error floor.

For illustrative purposes, exemplary embodiments of a correlation error compensation element will be described below in the context of correlation OTDR systems. However, it should be emphasized that similar correlation error compensation elements may be employed in other types of systems that perform correlation measurements.

Figure 1:
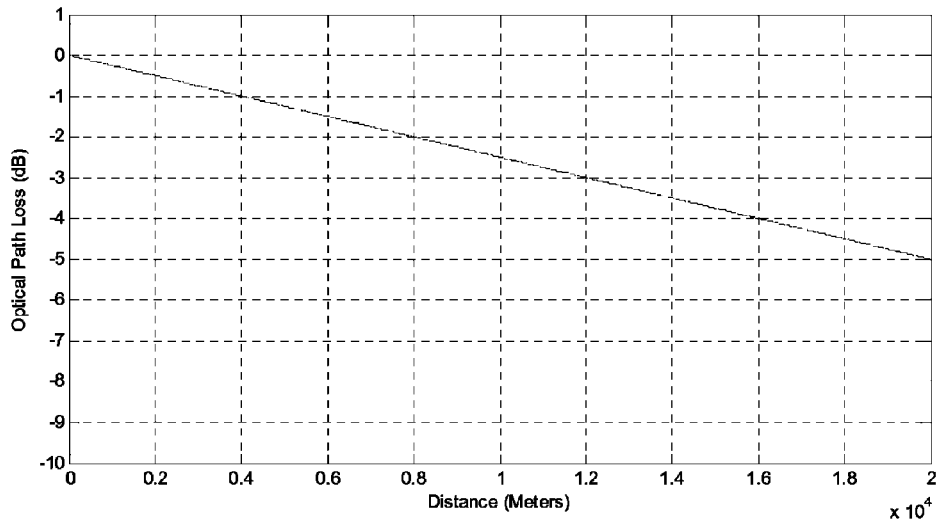
FIG. 1 is a graph illustrating exemplary theoretical optical path loss versus distance for a correlation optical time reflectometer (OTDR) system.
Figure 2:
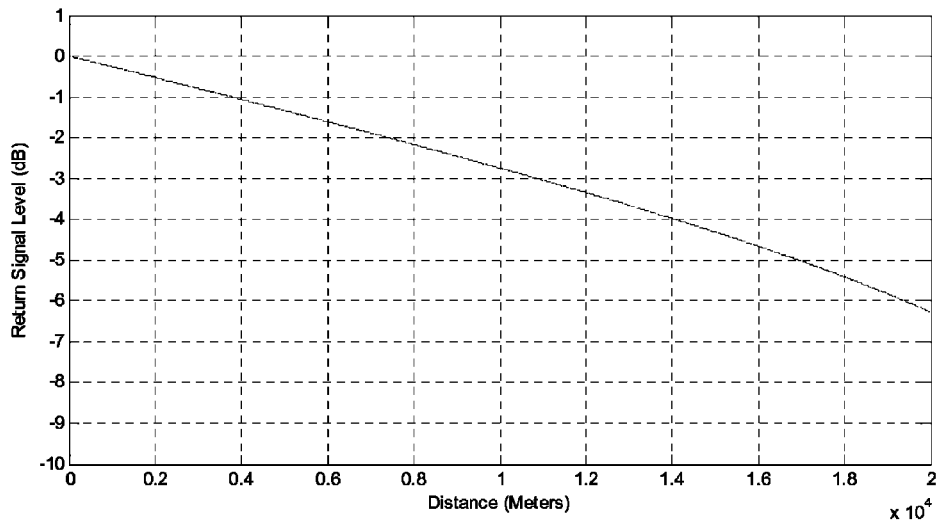
FIG. 2 is a graph illustrating the curve of FIG. 1 after the curve has been updated to account for the effects of the correlation error floor.
Figure 3:
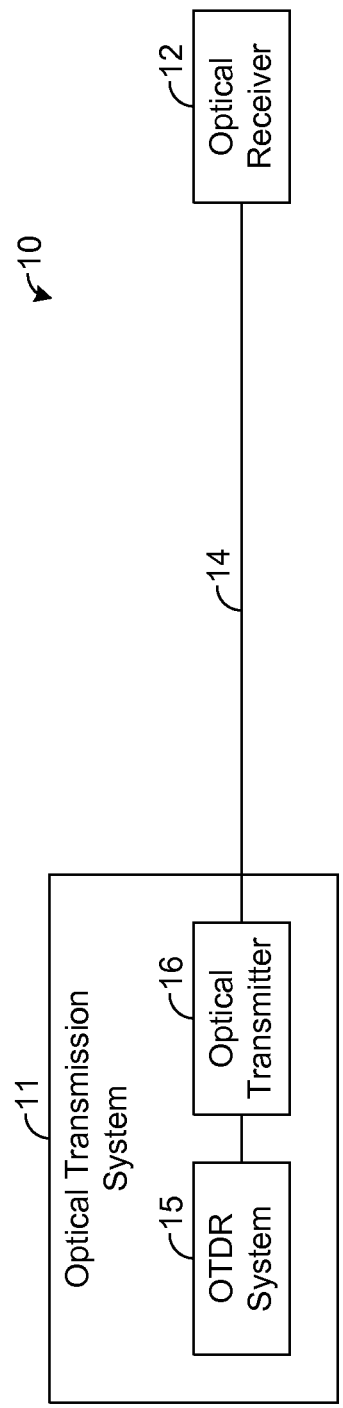
FIG. 3 is a block diagram illustrating an exemplary embodiment of a communication system in which an optical transmission system has a correlation OTDR system for unobtrusively detecting anomalies of an optical fiber while payload data is communicated across the fiber.

FIG. 3 depicts a communication system 10 having an optical transmission system 11 that transmits optical signals to an optical receiver 12 via an optical fiber 14. The transmission system 11 has a correlation OTDR system 15 coupled to an optical transmitter 16. The OTDR system 15 is configured to unobtrusively detect anomalies, such as degraded splices, along the optical fiber 14 via correlation measurements while payload data is being communicated across the fiber 14.

Figure 4:
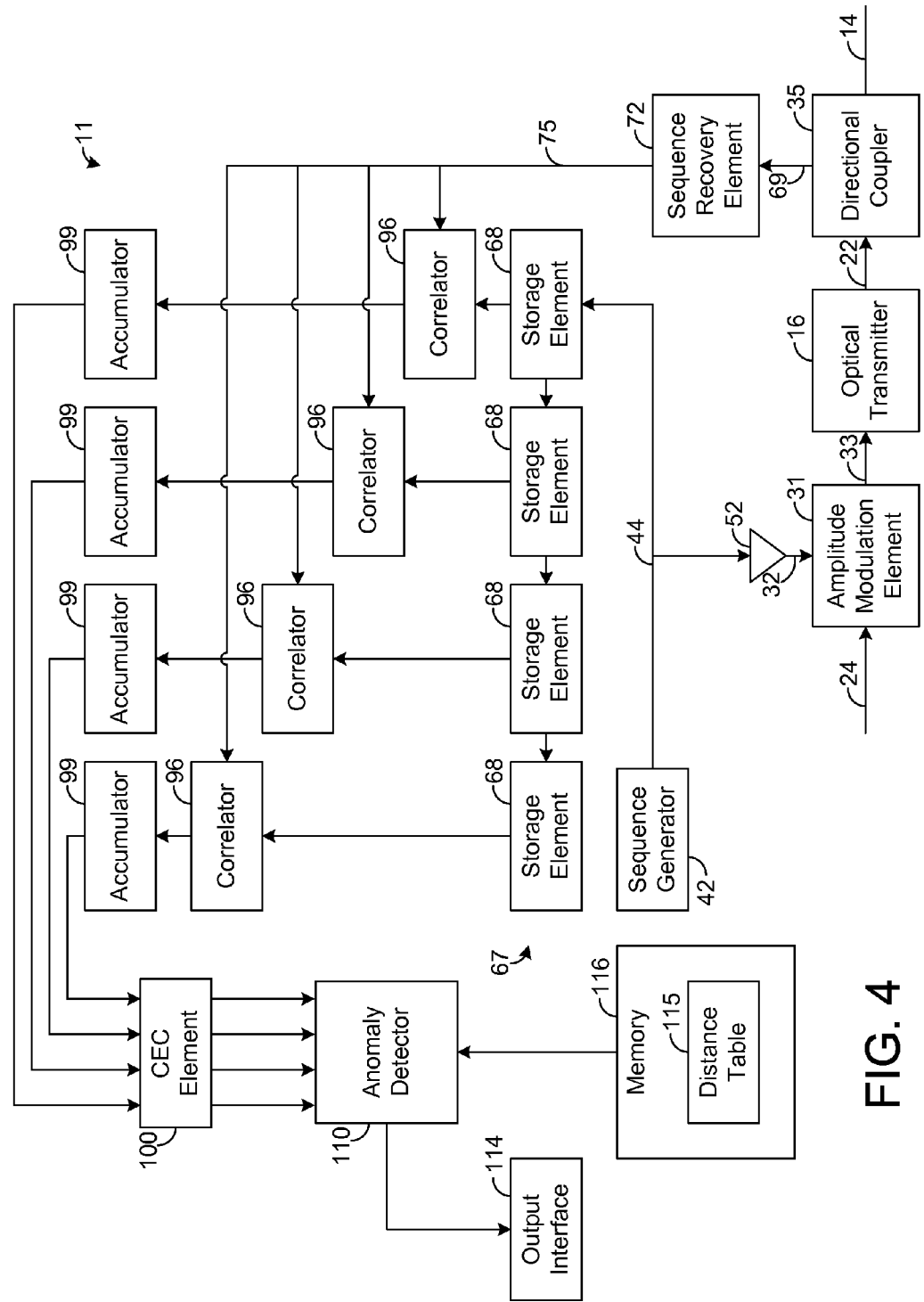
FIG. 4 is a block diagram illustrating an exemplary embodiment of an optical transmission system, such as is depicted by FIG. 3.

FIG. 4 depicts an exemplary embodiment of the optical transmission system 11. As shown by FIG. 4, the system 11 comprises an optical transmitter 16 that is configured to transmit, across an optical fiber 14, an optical data signal 22 carrying payload data from a received digital data signal 24. In this regard, the optical transmitter 16 is coupled to an amplitude modulation element 31 that is configured to modulate the pulses of the digital data signal 24 with an OTDR signal 32, as will be described in more detail hereafter, to provide an amplitude modulated (AM) data signal 33. The optical transmitter 16 is also coupled to a directional coupler 35 that is coupled to the optical fiber 14, as shown by FIG. 4. The optical transmitter 16 converts the AM data signal 33 to an optical data signal 22 that is transmitted through the directional coupler 35 to the optical fiber 14, which carries the optical signal 22 to the optical receiver 12 (FIG. 3) at a remote location. The optical receiver 12 detects the payload data and further processes the payload data as may be desired.

A sequence generator 42 generates a correlation sequence 44. As used herein, a "correlation sequence" refers to any digital data sequence that is used to perform correlation measurements. In one exemplary embodiment, the correlation sequence 44 is a PN sequence, such as an M-sequence. As known in the art, an M-sequence has correlation properties that generally make this type of sequence preferred for many correlation measurement applications, including anomaly detection. However, other types of digital data sequences, such as a random data sequence, may be used in other embodiments. For illustrative purposes, it will be assumed hereafter that the correlation sequence 44 is a PN sequence and, more specifically, an M-sequence.

An amplifier 52 amplifies values of the correlation sequence 44 to a desired level depending on the amplitude of the digital data signal 24, as will be described in more detail below, to provide the OTDR signal 32 that is to be combined with the digital data signal 24 via amplitude modulation. In one exemplary embodiment, the OTDR signal 32 has a frequency which is smaller than that of the digital data signal 24 by a factor of 100 such that groups of 100 adjacent pulses of the digital data signal 24 are modulated by a respective value of the OTDR signal 32. In another exemplary embodiment, the OTDR signal 32 has a frequency which is smaller than that of the digital data signal 24 by a factor of 250 such that groups of 250 adjacent pulses of the digital data signal 24 are modulated by a respective value of the OTDR signal 32. Other relative frequency scaling factors between the digital data signal 24 and the OTDR signal 32 may be used to optimize performance of the OTDR system 15, as will be apparent to one skilled in the art upon reading this disclosure.

Figure 5:
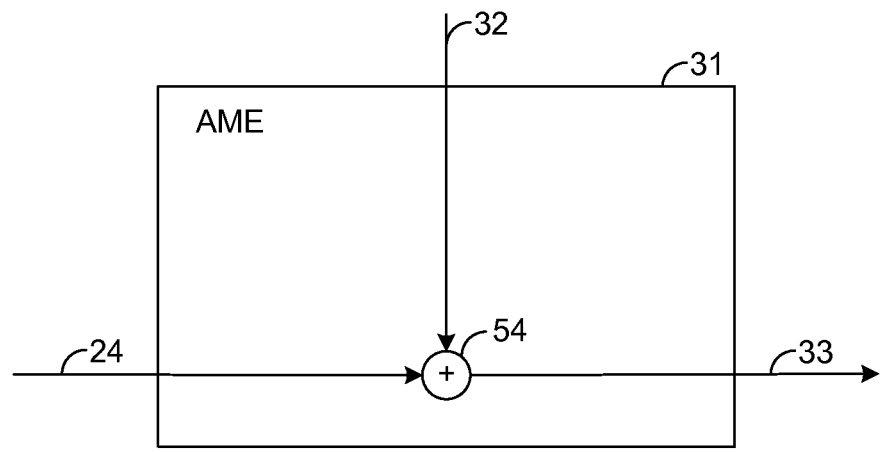
FIG. 5 is a block diagram illustrating an exemplary embodiment of an amplitude modulation element, such as is depicted by FIG. 4.
Figure 6:
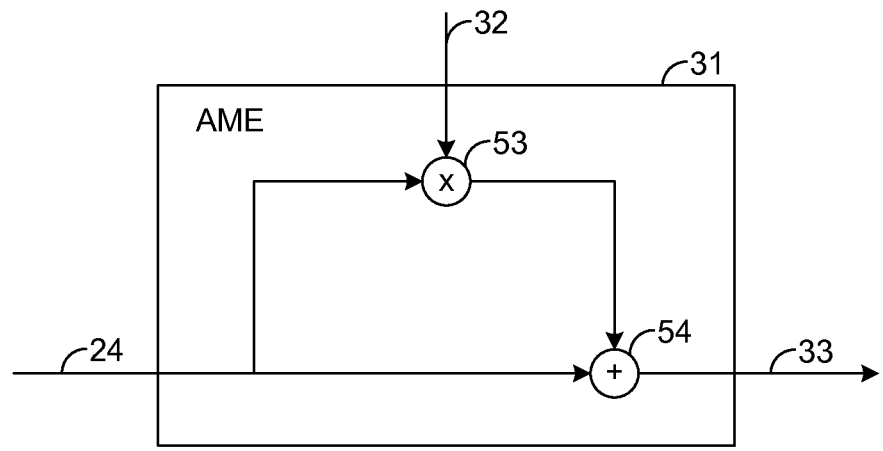
FIG. 6 is a block diagram illustrating another exemplary embodiment of an amplitude modulation element, such as is depicted by FIG. 4.

In one exemplary embodiment, the amplitude modulation element 31 comprises a summer 54, as shown by FIG. 5. The summer 54 sums the OTDR signal 32 with the digital data signal 24 to provide the AM data signal 33. In another exemplary embodiment, the amplitude modulation element 31 comprises a multiplier 53 and a summer 54, as shown by FIG. 6. The multiplier 53 multiplies the OTDR signal 32 by the digital data signal 24, and the summer 54 sums the output of the multiplier 53 with the digital data signal 24 to provide the AM data signal 33. Other structures might also be employed to implement amplitude modulation, as will be apparent to one skilled in the art upon reading this disclosure.

Preferably, modulation performed by the amplitude modulation element 31 affects the amplitude of the digital data signal 24 by a small percentage, such as less than about 10% of the peak amplitude of the digital data signal 24 in an effort to keep interference with the signal 24 low. In this regard, increasing the amplitude of the OTDR signal 32 generally improves the performance of the OTDR measurements but also increases the interference introduced to the digital data signal 24 by the amplitude modulation element 31. In other embodiments, other amplitude percentages are possible. Limiting the modulation such that it affects the amplitude of the data signal 24 by no more than a small amount, such as about 10%, helps to ensure that the optical receiver 12 (FIG. 3) is able to recover the payload data defined by the digital data signal 24.

Figure 7:
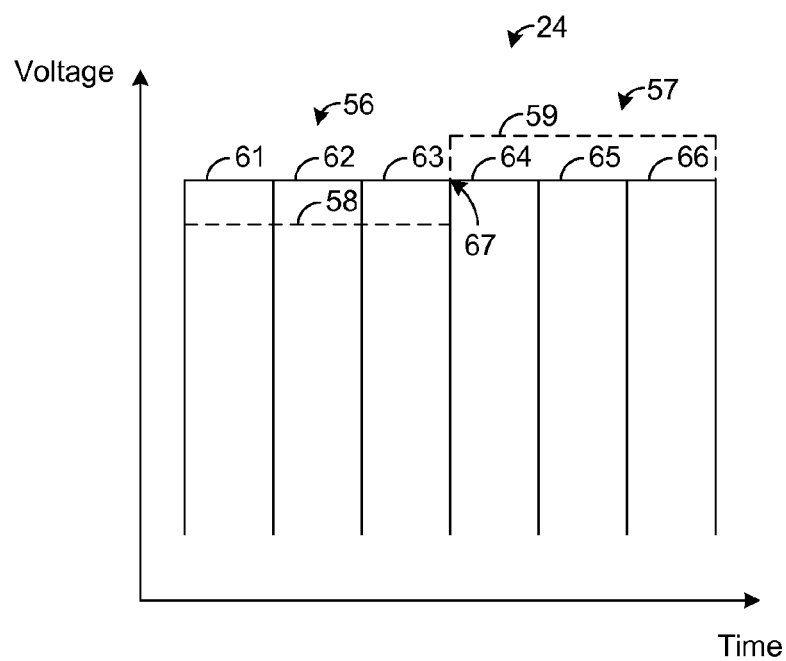
FIG. 7 is a graph illustrating exemplary groups of pulses of a digital data signal, such as is depicted by FIG. 4.

To better illustrate the effect of amplitude modulation on the digital data signal 24, refer to FIG. 7, which depicts two exemplary pulse groups 56, 57 of the digital data signal 24. The group 56 comprises three consecutive pulses 61-63, and the group 57 comprises three consecutive pulses 64-66, which immediately follow the pulses 61-63 of the group 56. For illustrative purposes, each pulse 61-66 is shown as having the same bit value, although it is possible for the bit values of the pulses 61-66 to be different relative to one another. In addition, for illustrative purposes, each group 56, 57 is shown as having three pulses, but the groups 56, 57 may have any number of pulses in other embodiments. Also for illustrative purposes, assume that a transition from a correlation sequence value of +1 to a correlation sequence value of −1 occurs for the correlation sequence 44 at the transition point 67 between the pulses 63 and 64. Thus, each of the pulses 64-66 of the group 57 is combined with the same correlation sequence value (+1 in this example), and each of the pulses 61-63 of the group 56 is combined with the same correlation sequence value (−1 in this example).

Figure 8:
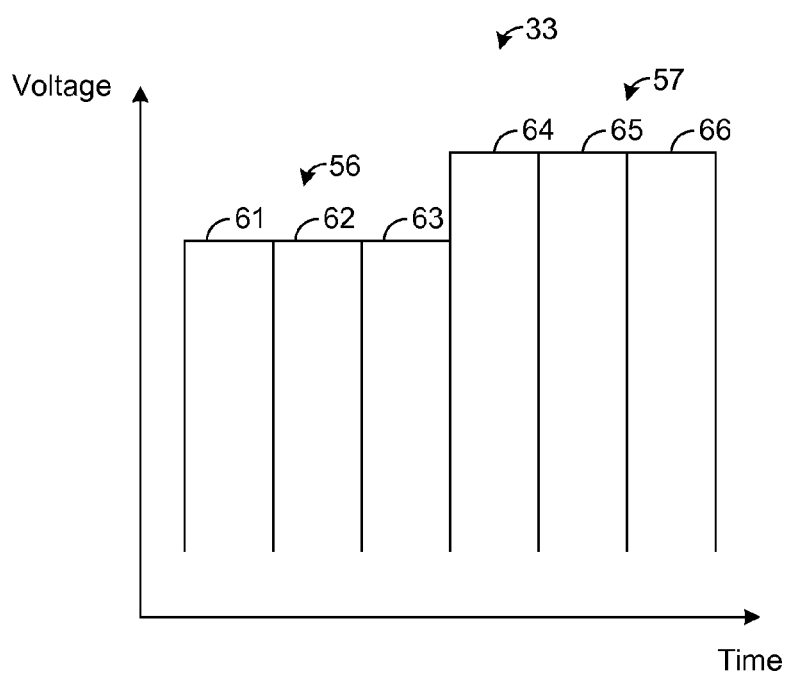
FIG. 8 is a graph illustrating the pulse groups of FIG. 7 after amplitude modulation by the amplitude modulation element depicted by FIG. 5 or FIG. 6.

The dotted lines 58, 59 indicate the amplitude levels of the pulses 61-63 and 64-66, respectively, after amplitude modulation by the correlation sequence 44. As shown by the dotted lines 58, 59, as well as FIG. 8, which shows the pulse groups 56, 57 after amplitude modulation, the amplitude of each pulse 61-63 is decreased by a small amount by combining a correlation sequence value of −1 with such pulses 61-63, and the amplitude of each pulse 64-66 is increased by a small amount by combining a correlation sequence value of +1 with such pulses 64-66.

As shown by FIG. 4, the sequence generator 42 is coupled to a delay line 67 through which the correlation sequence 44 is serially shifted. In this regard, the delay line 67 has a plurality of storage elements 68, and each storage element 68 stores a respective value (i.e., +1 or −1) of the correlation sequence 44 as it is being shifted through the delay line 67.

During transmission, portions of the optical signal 22 reflect back toward the optical transmitter 16 as it travels along the optical fiber 14. The amplitude of the optical signal 22 that is reflected at each location is affected by normal backscattering and by line anomalies, such as degraded splices. The directional coupler 35 receives from the fiber 14 an optical signal 69, referred to hereafter, as the "reflected optical signal," comprising the reflections of the optical signal 22 as it travels along the fiber 14. The directional coupler 35 transmits the reflected optical signal 69 to a sequence recovery element 72, which converts the optical signal reflections to digital samples 75 defining a sequence of digital values. In one exemplary embodiment, the digital samples 75 are serially transmitted at the same frequency as the correlation sequence 44.

Figure 9:
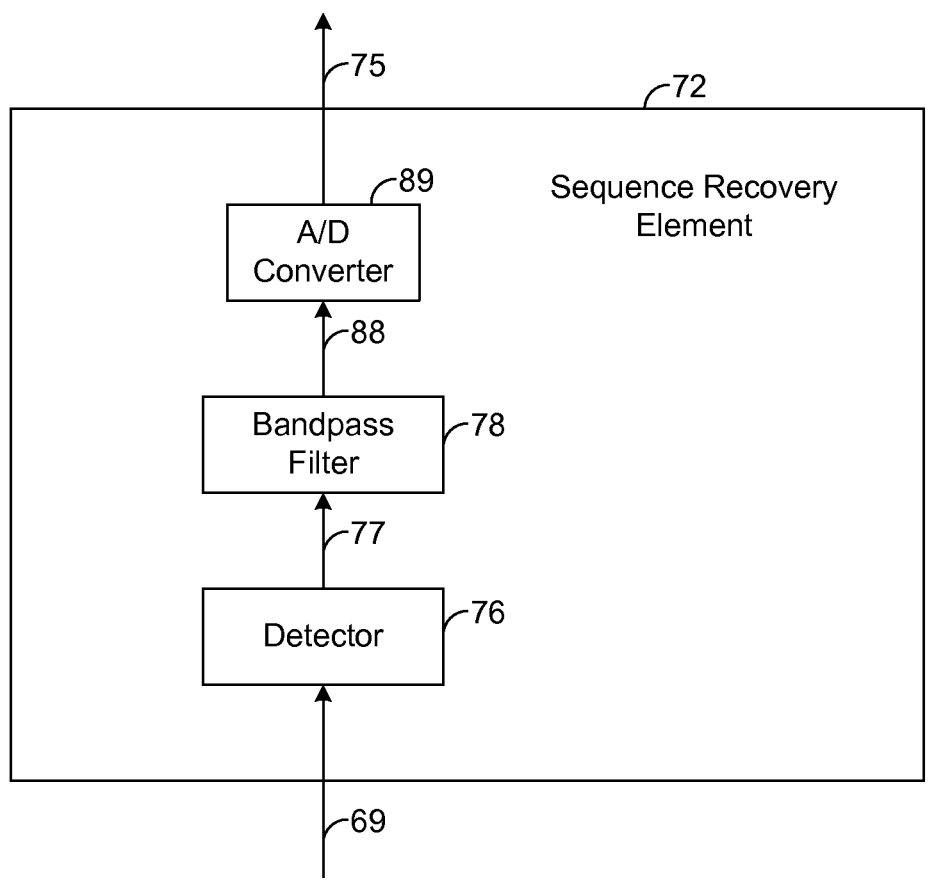
FIG. 9 is a block diagram illustrating an exemplary embodiment of a sequence recovery element, such as is depicted by FIG. 4.

FIG. 9 depicts one exemplary embodiment of the sequence recovery element 72. In this embodiment, the element 72 has a detector 76 that receives the reflected optical signal 69 and converts the optical signal 69 to an analog electrical signal 77. A bandpass filter 78 filters the analog signal 77 in order to substantially remove the high frequency optical modulation associated with the payload data signal 24 and simultaneously remove direct current (DC) offset from the signal, while passing the modulation associated with the PN sequence OTDR signal 44, providing a filtered signal 88 having amplitude appropriate for analog-to-digital conversion. An analog-to-digital (A/D) converter 89 converts the analog signal 88 to digital values. In this regard, the sequence recovery element 72 is configured to output digital values 75, referred to as "samples," and each digital sample 75 is based on reflected signal components that have been reflected from points along the fiber 14. Each such signal component is indicative of the correlation sequence value used to modulate its contribution to such sample 75. That is, the digital value 75 represents the sum of reflected signal components that have been reflected at different points along the fiber 14, and each such signal component has been modulated by a respective correlation sequence value.

The digital sample 75 recovered by the element 72 is transmitted to a plurality of correlators 96 respectively coupled to the storage elements 68 of the delay line 67, as shown by FIG. 4. Each correlator 96 correlates (i.e., multiplies and accumulates) successive digital samples 75 with values stored in a respective one of the storage elements 68. As will be described in more detail hereafter, the correlation sequence 44 is serially shifted through the storage elements 68 of the delay line 67. As shown by FIG. 4, the correlators 96 are respectively coupled to plurality of accumulators 99 that receive the output values, referred to hereafter as "correlation values," of the correlators 96.

Each accumulator 99 accumulates the correlation values from a respective correlator 96 to further enhance the accuracy of the correlation values. Note that use of the accumulators 99 is optional. If desired, anomaly decisions may be based on the correlation values from the correlators 96 without additional accumulation by the accumulators 99. Furthermore, the accumulators 99 may be renormalized by rescaling periodically to avoid overflow, or reset to zero if desired at the initiation of a new testing interval, or both.

Figure 12:
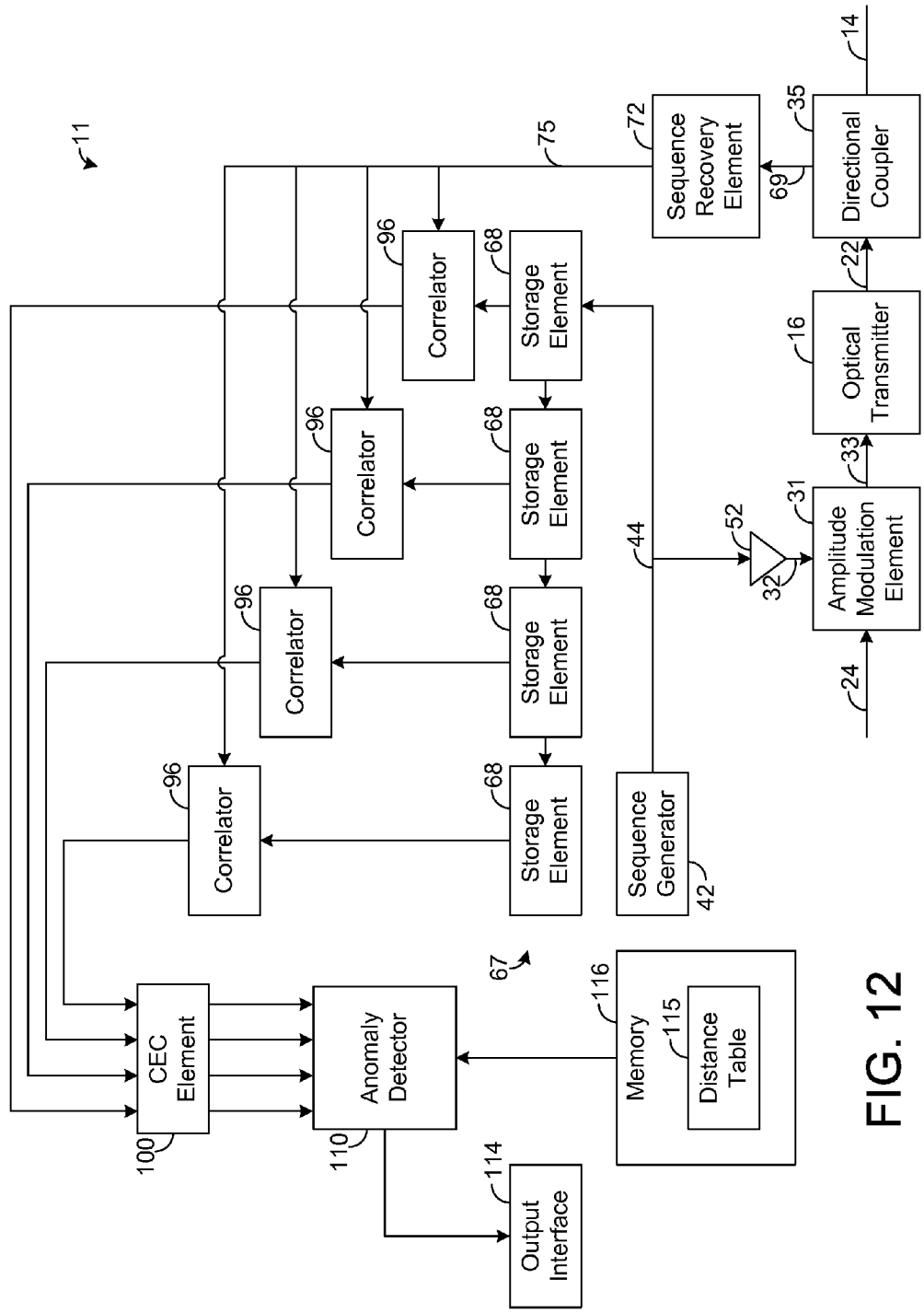
FIG. 12 is a block diagram illustrating an exemplary embodiment of an optical transmission system, such as is depicted by FIG. 3.

As shown by FIG. 4, the accumulators 99 are coupled to a correlation error compensation (CEC) element 100. As will be described in more detail hereafter, the CEC element 100 processes the correlation values from the accumulators 99 (referred to hereafter for clarity as "accumulated correlation values") in order to remove error attributable to the correlation error floor. That is, the CEC element 100 adjusts each accumulated correlation value, x, from a respective accumulator 99 in order to provide a compensated correlation value, y, that is substantially free of the effects of the correlation error floor. If the accumulators 99 are not used, the CEC element 100 may similarly compensate the correlation values from the correlators 96. FIG. 12 depicts an exemplary embodiment in which the correlation values input to the CEC element 100 are directly from the correlators 96. Preferably, the CEC element 100 is used to compensate whichever correlation values are to be input to the anomaly detector 110 before they are compared with values stored in the anomaly detector 110, as will be described in more detail below.

Note that each correlator 96 corresponds to a respective location along the optical fiber 14. In this regard, for a given correlator 96, there is a finite delay from the time that a value of the correlation sequence 44 is transmitted by the optical transmitter 16 until the value is shifted into the storage element 68 that is coupled to the correlator 96. Such delay shall be referred to as the correlator's "sequence delay." Further, each point along the optical fiber 14 has a reflection delay that is based on the point's distance from the optical transmitter 16. As used herein, a point's "reflection delay" is the amount of time for a sample to travel from the optical transmitter 16 to the point, return to the detector 76, and reach the correlator 96. Generally, the further the point is from the optical transmitter 16, the greater is the point's reflection delay. Moreover, the fiber location corresponding to a particular correlator 96 is that location along the fiber 14 where the reflection delay is equal to the correlator's sequence delay. Thus, if a particular correlation sequence value ($V_1$) transmitted by the optical transmitter 16 is reflected at the point along the fiber 14 corresponding to a given correlator 96, then the transmitted value ($V_1$) should have been delayed by the delay line 67 such that it is in the storage element 68 coupled to the correlator 96 when the reflection of the value ($V_1$) is received from the fiber 14 by such correlator 96. Therefore, at the inputs to the correlator 96, the algebraic sign of the value ($V_1$) should match the algebraic sign of the signal component reflected from the corresponding point along the fiber. Note that, for each correlator 96, the accumulator 99 that accumulates correlation values from the correlator 96 and the storage element 68 that provides correlation sequence values to the correlator 96 also correspond to the same fiber location as the correlator 96. Moreover, the storage element 68 corresponding to a particular fiber location is that storage element 68 that is storing a value ($V_1$) when the reflection of such value is received from the fiber 14 by the correlator 96 that correlates such value.

In addition, each correlator 96 is implemented as a multiplier followed by an accumulator, and the correlation value in each correlator 96 is reset (e.g., re-initialized to a value of zero) at the end of each period or an integer number of periods of the correlation sequence 44, after the correlation result has been accumulated by the associated accumulator 99 and transferred to the anomaly detector 110 (FIG. 4) through the CEC element 100. In one exemplary embodiment, the correlation sequence 44 is an M-sequence comprising a particular succession of values of +1 and −1. Accordingly, for each correlator 96, the input from a storage element 68 is either a value of +1 or a value of −1. Thus, when the input from a storage element 68 to the correlator 96 has the same algebraic sign as a reflected signal component appearing at the other input, then the correlator 96 outputs a value containing a component corresponding to these inputs that is greater than zero. In particular, if the inputs for the M-sequence value and for a reflected signal component with the corresponding delay both have positive algebraic signs, then the product of these inputs provides a contribution to the output that is greater than zero. Further, if the inputs for the M-sequence value and for a reflected signal component with the corresponding delay both have negative algebraic signs, then the product of these inputs provides a contribution to the output that also is greater than zero.

For contributions to the signal sample 75 reflected from a location on the fiber 14 with delay corresponding to the sequence delay for the correlator 96, the algebraic signs of the inputs match, and the correlation value is indicative of these signal contributions. However, for contributions to the signal sample 75 from all points on the fiber 14 where the reflection delay does not correspond to the correlator sequence delay for the correlator 96, the signs of the signal contributions from such locations are not related to the sign of the M-sequence input to the correlator 96, so that the products involving such signal contributions are approximately equally likely to be positive or negative, accumulating approximately to a zero value across the interval spanned by each period of the M-sequence. In this regard, the M-sequence is preferred in minimizing correlation spanning a full period of the sequence at all offset delay values other than zero delay, which is well known to one of ordinary skill in the art, minimizing signal contributions from all points where the reflection delay does not correspond to the sequence delay for correlator 96. Therefore, each correlator 96, as well as its associated accumulator 99, provides a value which is indicative of the amount of light reflected from the corresponding location along the fiber and substantially independent of the amount of light reflected from all other locations along the fiber 14.

Furthermore, the correlation sequence selected for the sequence generator 42 preferably corresponds to a time interval greater than, or at least as great as, both the largest sequence delay associated with any storage element 68 of the delay line 67 and also the largest reflection delay associated with any point along the fiber 14. Such an arrangement helps to avoid ambiguity that would result from two or more storage elements 68 simultaneously storing identical consecutive correlation sequence values or more than one fiber location simultaneously reflecting identical consecutive correlation sequence values as the correlation sequence is repeated.

As known in the art, a fiber optic line free of anomalies exhibits reflections along its length with amplitudes that are reduced in a uniform manner with increasing distance from the point where the signal is transmitted into the fiber. Furthermore, this reduction in reflected light with distance for such a fiber free from anomalies follows a predictable, nominal characteristic rate of attenuation corresponding to the parameters of the particular fiber involved. However, for a fiber with an anomaly, at the point where a line anomaly (e.g., a degraded splice) exists, more attenuation may occur as light passes through the anomaly, and in some cases more light may be reflected at this point than at other points that are free of anomalies.

Moreover, the values from the accumulators 99 can be analyzed to identify the locations of anomalies, such as degraded splices, along the fiber 14. In this regard, an anomaly detector 110 is coupled to each accumulator 99 through the CEC element 100. The anomaly detector 110 receives from each accumulator 99, an accumulated correlation value, which has been adjusted by the CEC element 100 to remove error caused by the correlation error floor as will be described in more detail below and which represents a sum of the values output by the associated correlator 96 (i.e., the correlator 96 that is coupled to the accumulator 99). The anomaly detector 110 compares such accumulated correlation value to anticipated nominal values and in a preferred embodiment also to previously accumulated correlation values that have been stored by the anomaly detector 110. If the accumulated correlation value currently received is consistent with the anticipated nominal values and in a preferred embodiment to previously accumulated and stored values, then the anomaly detector 110 determines that no anomaly exists at the fiber location corresponding to the associated correlator 96. However, if the accumulated correlation value is significantly different from the anticipated nominal value or in a preferred embodiment from previously accumulated and stored values, then the anomaly detector 110 determines that an anomaly, such as a degraded splice, exists at the fiber location corresponding to the associated correlator 96.

The foregoing techniques for comparing accumulated correlation values in order to detect anomalies are presented for illustrative purposes. It should be emphasized that other types of comparisons and techniques for detecting anomalies based on the data provided by the correlators 96 are possible in other embodiments. Commonly-assigned U.S. patent application Ser. No. 12/783,999, entitled "Systems and Methods for Unobtrusively Testing Optical Fibers" and filed on May 20, 2010, which is incorporated herein by reference, describes exemplary embodiments of correlation OTDR systems. U.S. patent application Ser. No. 12/768,999 describes exemplary techniques and circuits for multiplexing the correlators 96 in order to reduce the circuitry required to implement the correlators 96. Such techniques and circuits may be used in the embodiments described herein, if desired.

If the anomaly detector 110 detects an anomaly, the anomaly detector 110 transmits a message indicative of the detection. The message may be a visual and/or audio message and preferably indicates the location of the anomaly (i.e., the distance of the anomaly from the optical transmitter 16). The message may be displayed to a user via an output interface 114, such as a display device or a printer, to notify a user of the detected anomaly.

In one exemplary embodiment, when the anomaly detector 110 reports an anomaly, the detector 110 provides a value indicative of the anomaly's location along the optical fiber 14. In this regard, a distance table 115 (FIG. 4) is predefined and stored in memory 116. The distance table 115 has an identifier for each correlator 96 and maps each identifier to a distance value. Such distance value indicates the distance (relative to the transmitter 16) of the fiber location that corresponds to the identified correlator 96. When the anomaly detector 110 detects an anomaly based on the output of a correlator 96 (e.g., based on the value in the accumulator 99 that accumulates the correlator's output), the anomaly detector 110 retrieves the distance value mapped to this correlator 96 and provides the distance value when reporting the anomaly. Such distance value indicates the reported anomaly's distance from the transmitter 16. Thus, based on the message provided by the anomaly detector 110, the user is aware of not just the existence of the anomaly but also of the anomaly's approximate location along the fiber 14. Such information can be used to help a technician to quickly find and repair the anomaly.

Note that, in one exemplary embodiment, the components of the OTDR system 15 are implemented in hardware. However, in other embodiments, it is possible for various components to be implemented in hardware, software, firmware, or combinations thereof.

Notably, the OTDR system 15 allows for the testing of the fiber 14 for anomalies while simultaneously communicating payload data along the fiber 14. In this regard, the modulation of the digital data signal 24 with the correlation sequence 44 is kept small enough such that the receiver 12 is able to recover the payload data despite the small amount of noise introduced by such modulation. Thus, simultaneous anomaly testing and data communication is achieved without significantly impairing the communication performance of the system 10. However, in other embodiments, other configurations are possible. As an example, data transmission may be temporarily stopped during the correlation measurements performed by the system 15. In such an embodiment, the amplitude of the correlation sequence transmitted across the fiber 14 may be greater since interference with data communication is not a concern.

In addition, it is also possible for the anomaly detector 110, if employed, to be located remotely from other components of the system 11, such as the accumulators 99 and correlators 96. As an example, the correlation values from either the correlators 96 or the accumulators 99, as compensated by the CEC element 100, may be transmitted to the anomaly detector 110 via a network or may be downloaded to a computer readable-medium, which is transported to a computer or other type of apparatus that analyzes the accumulation values or correlation values for indications of line anomalies. Various other modifications and changes would be apparent to one of ordinary skill upon reading this disclosure.

Figure 10:
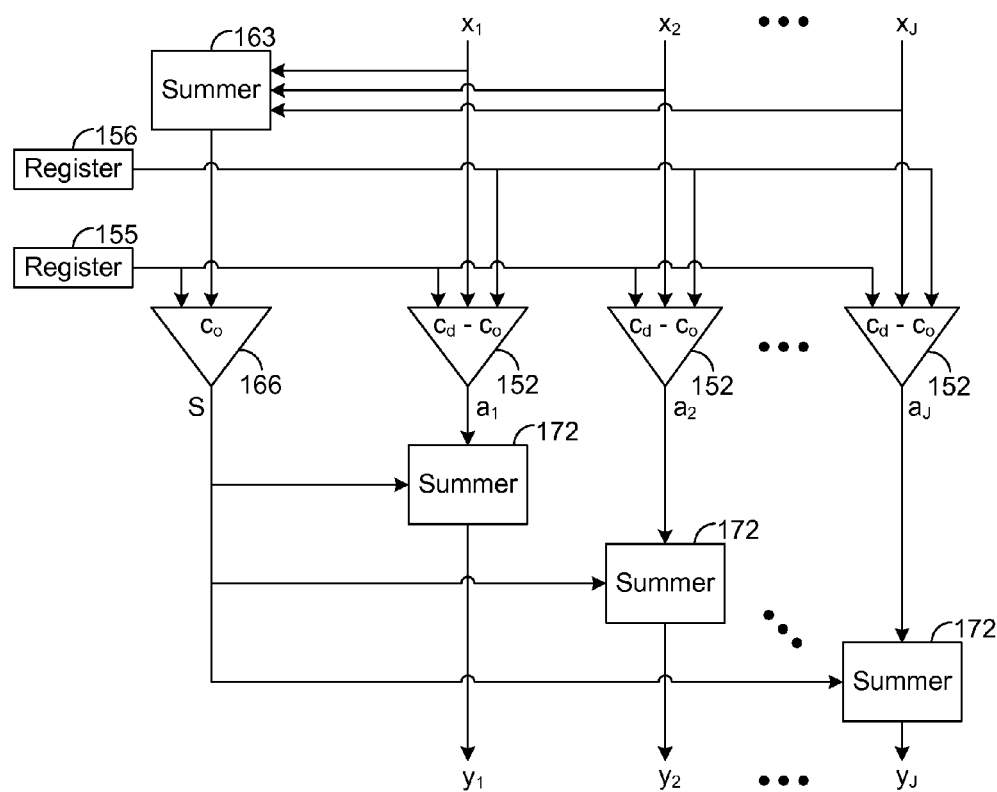
FIG. 10 is a block diagram illustrating an exemplary embodiment of a correlation error compensation (CEC) element, such as is depicted by FIG. 4.

Furthermore, various techniques may be used by the CEC element 100 in order to compensate correlation values (e.g., accumulated correlation values from the accumulators 99 or correlation values directly from the correlators 96) for the effects of the correlation error floor. An exemplary embodiment of the CEC element 100 is depicted in FIG. 10. As shown by FIG. 10, the CEC element 100 comprises a bank of combiners 152 in which each combiner 152 is coupled to a respective accumulator 99, and each combiner 152 receives as input the accumulated correlation value from the respective accumulator 99 coupled to it. As used herein, "J" shall refer to the number of correlators 96 used in performing correlation measurements in the system 15. Since there are J correlators 96 actively providing correlation measurements, there should be J accumulators 99 actively providing accumulated correlation values ($x_1$ to $x_J$). In the exemplary embodiment shown by FIG. 4, J is equal to four when all correlators 96 are being used for correlation measurements, but other numbers of correlators 96 and values of J are possible in other embodiments.

Each combiner 152 is coupled to registers 155 and 156 and receives inputs from such registers 155 and 156. In particular, each combiner 152 receives a constant value, referred to hereafter as "$c_o$," from the register 155, and each combiner 152 receives another constant value, referred to hereafter as "$c_d$," from the register 156. Such constants may be provisioned by a user depending on the configuration and/or implementation of the system 11. For example, as will be described in more detail hereafter, $c_o$ and $c_d$ are both functions of J and N, which may be different for different applications. In this regard, for a short fiber 14, a user may elect to use less than all of the correlators 96 to actively perform correlation measurements and, thus, deactivate at least some of the correlators 96, thereby reducing the value of J. In such case, the values of $c_o$ and $c_d$ may be updated to reflect the actual number of correlators 96 being used for correlation measurements. Also, a user may elect to use a certain value of N based on the length of the fiber 14 or other considerations. Based on the selected N, a user preferably establishes $c_d$ and $c_o$.

In one exemplary embodiment, $c_d$ and $c_o$ are defined according to the following equations:

$$c_d = [1+(J-2)r]/[1+(J-2)r-(J-1)r^2]$$

$$c_o = -r/[1+(J-2)r-(J-1)r^2]$$

where r is equal to $(-1/N)$ and where N is the bit length of the correlation sequence 44 (e.g., M-sequence).

Each combiner 152 is configured to mathematically combine each of its inputs, including $c_d$, $c_o$, and a respective accumulated correlation value, x. In one exemplary embodiment, each combiner 152 calculates the difference between $c_d$ and $c_o$ and multiplies such difference by the received correlation value, x. Thus, the output of each combiner 152 is equal to $x(c_d-c_o)$, where x is the respective correlation value received by the combiner 152.

As shown by FIG. 10, the CEC element 100 further comprises a summer 163 that is configured to receive and sum all of the correlation values, $x_1$ to $x_J$, in the current set of correlation values. Note that each correlation value in the set is simultaneously received by a respective one of the combiners 152. Thus, a given set of correlation values includes one correlation value for each active correlator 96. After performing a sum operation for the current set of accumulated correlation values, the summer 163 is reset such that the sum for the current set of correlation values does not affect the sum calculated by the summer 163 for the next set.

A combiner 166 is coupled to the summer 163 and the register 155 and is configured to scale the sum calculated by the summer 163 to a value (S) by multiplying such sum and $c_o$. The combiner 166 is coupled to a bank of summers 172, and each summer 172 is configured to receive the scaled sum (S) from the combiner 166. Each summer 172 is also coupled to a respective one of the combiners 152 and is configured to receive the output, a, of such combiner 152. Each summer 172 is configured to sum the output from its respective combiner 152 and the scaled sum (S) from the combiner 166 to provide a compensated correlation value $y_n$. Accordingly, the accumulated correlation values, $x_1$ to $x_J$, are respectively converted to compensated correlation values, $y_1$ to $y_J$, which are substantially free of the effects of the correlation error floor. The compensated correlation values are then used by the anomaly detector 110 (FIG. 4) to detect anomalies along the fiber 14 according to the techniques described above. Note that the correlation compensation algorithm is preferably applied to correlation values that were derived using correlation measurements taken over a full period, or an integer multiple of full periods, of the correlation sequence (e.g., M-sequence).

It can be observed that the compensated results provided by the CEC element 100 are not averaged or accumulated, though such results are based on input values that have been accumulated by the accumulators 99 and correlators 96. In this regard, when a set of compensated correlation values are output from the CEC element 100, the next set of compensated correlation values are not based on the previous set of compensated correlation values but rather are calculated based on the accumulated values input to the CEC element 100. That is, the compensation algorithm is performed anew on each set of accumulation values input to the CEC element 100 without any averaging of the compensated correlation values output by the summers 172 of the CEC element 100.

An exemplary operation and use of the CEC element 100 in processing a set of accumulated correlation values, $x_1$ to $x_J$, shall be described in more detail below with particular reference to FIG. 11. Note that the set of accumulated correlation values are simultaneously received by the bank of combiners 152.

Figure 11:
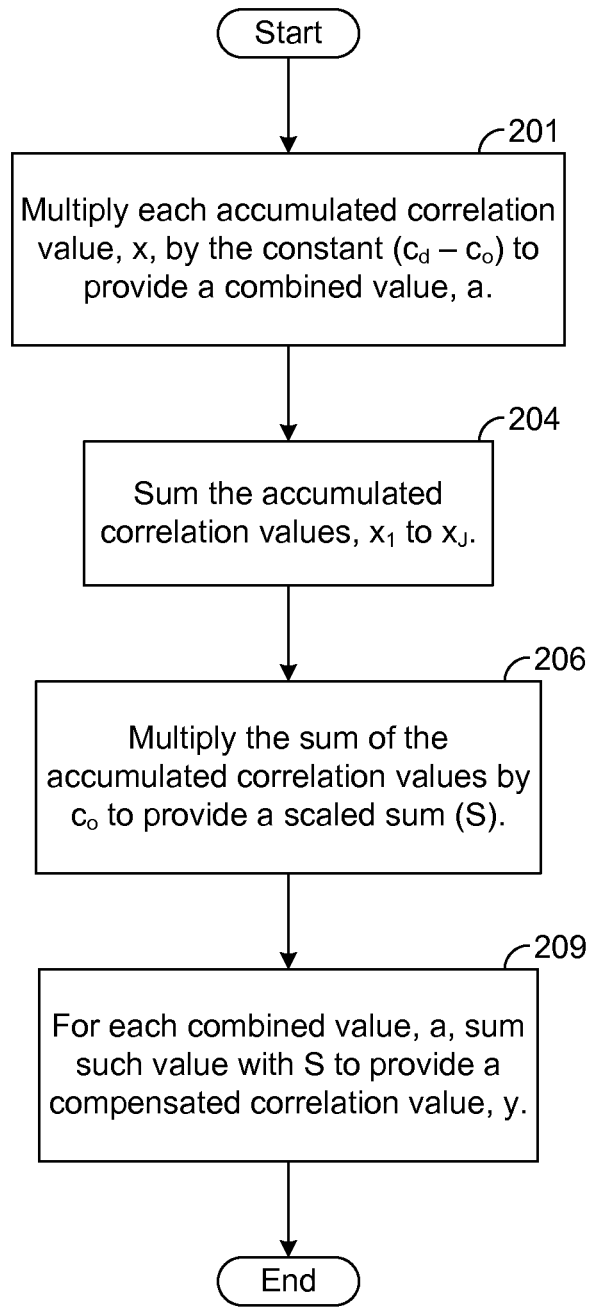
FIG. 11 is a flowchart illustrating an exemplary method of adjusting correlation values to compensate for the correlation error floor.

As shown by block 201 of FIG. 11, each combiner 152 multiples a respective accumulated correlation value, x, of the set by the constant ($c_d-c_o$) to provide a combined value, a. Thus, the accumulated correlation values, $x_1$ to $x_J$, of the set are converted to combined values, $a_1$ to $a_J$, by the combiners 152. In addition, as shown by blocks 204 and 206 of FIG. 11, the summer 163 sums the accumulated correlation values, $x_1$ to $x_J$, of the set, and the combiner 166 multiplies such sum by $c_o$ to provide a scaled sum (S). As shown by block 209 of FIG. 11, each summer 172 then multiples a respective combined value a from a respective combiner 152 by the sum (S) to provide a compensated correlation value, y. Thus, the combined values $a_1$ to $a_J$ are converted to compensated correlation values, $y_1$ to $y_J$. Hence, the process shown by FIG. 11 converts the set of accumulated correlation values, $x_1$ to $x_J$, output by the accumulators 99 to a set of compensated correlation values, $y_1$ to $y_J$, which can be used by the anomaly detector 110 to detect line anomalies. Due to the processing performed by the CEC element 100, the compensated correlation values, $y_1$ to $y_J$, have less error than the accumulated correlation values, $x_1$ to $x_J$, thereby improving the accuracy of the anomaly decisions.

In various embodiments described above, the CEC element 100 is described in the context of an OTDR system 15 that embeds the correlation sequence in a data signal. However, it should be emphasized that the CEC element 100 may be similarly used in other types of correlation systems, such as OTDR systems that do not attempt to embed the correlation sequence in a data signal. Such an OTDR system may be configured in the same way as the one shown by FIG. 4 except that the correlation sequence is not used to modulate a data signal but rather is used to modulate an optical signal that carries the correlation sequence only. In addition, the CEC element 100 may be used in non-OTDR correlation systems. As an example, the CEC element 100 may be used in a radar system that wirelessly transmits a correlation sequence and correlates the returns with the transmitted sequence, as is described in the above OTDR embodiments. There are various other types of correlation systems that may employ the CEC element 100 in order to cancel contributions of the correlation error floor from correlation measurements.

In addition, as described above, the use of the accumulators 99 is unnecessary, and anomaly detections may be based on correlation values from the correlators 96 without the additional accumulation provided by the accumulators 99. In such an embodiment, the CEC element 100 may compensate the correlation values from the correlators 96 via the same techniques described above. In this regard, the configuration of the CEC element 100 may be identical to that shown by FIG. 10, and the values $x_1$ to $x_J$ may represent the correlation values respectively output by the active correlators 96. Various other modifications and changes would be apparent to a person of ordinary skill upon reading this disclosure.

Now, therefore, the following is claimed:

1. A correlation system, comprising:
a transmitter configured to transmit a correlation sequence;
receive circuitry configured to receive returns from the transmitted correlation sequence;
a plurality of correlators coupled to the receive circuitry and configured to correlate the correlation sequence with the returns to provide a set of correlation measurement values respectively associated with the returns, wherein the set comprises a respective correlation measurement value from each of the correlators, each of the correlation measurement values corresponding to a respective distance from the transmitter and indicative of a condition at the corresponding distance, wherein one of the correlation measurement values associated with one of the returns is corrupted by error from a plurality of the returns; and
a correlation error compensation (CEC) element configured to receive the correlation measurement values and to adjust the one correlation measurement value based on a plurality of the correlation measurement values thereby compensating the one correlation measurement value for the error.

2. The system of claim 1, wherein the correlation sequence is an M-sequence.

3. The system of claim 1, further comprising an output interface configured to provide a display based on the one correlation measurement value.

4. The system of claim 1, wherein the transmitter is configured to transmit the correlation sequence via an optical signal along an optical fiber.

5. The system of claim 4, further comprising an anomaly detector configured to detect an anomaly along the optical fiber based on the one correlation measurement value.

6. The system of claim 5, further comprising an amplitude modulation element configured to embed the correlation sequence in a data signal, and wherein the transmitter is configured to convert the data signal into the optical signal.

7. The system of claim 1, wherein the CEC element comprises a combiner configured to receive a constant value and to mathematically combine the constant value with the one correlation measurement value thereby providing a combined value.

8. The system of claim 7, wherein the CEC element comprises a first summer configured to receive and sum the correlation measurement values thereby providing a sum value.

9. The system of claim 8, wherein the CEC element comprises a second summer configured to sum the combined value and the sum value.

10. The system of claim 1, wherein the CEC element comprises a combiner configured to receive a first value and a second value and to determine a difference between the first and second values, the CEC element further configured to combine a value indicative of the difference with the one correlation measurement value.

11. The system of claim 10, wherein the first value is equal to:

$$[1+(J-2)r]/[1+(J-2)r-(J-1)r^2],$$

wherein J is equal to a number of the correlators, wherein r is equal to (−1/N), and wherein N is a bit length of the correlation sequence.

12. The system of claim 11, wherein the second value is equal to:

$$-r/[1+(J-2)r-(J-1)r^2].$$

13. The system of claim 12, wherein the correlation sequence is an M-sequence.

14. A correlation method, comprising:
transmitting a correlation sequence from a transmitter;
receiving returns from the transmitted correlation sequence;
correlating the correlation sequence with the returns to provide a set of correlation measurement values respectively associated with the returns, each of the correlation measurement values corresponding to a respective distance from the transmitter and indicative of a condition at the corresponding distance, wherein one of the correlation measurement values associated with one of the returns is corrupted by error from a plurality of the returns; and
adjusting the one correlation measurement value based on a plurality of the correlation measurement values thereby compensating the one correlation measurement value for the error.

15. The method of claim 14, wherein the correlation sequence is an M-sequence.

16. The method of claim 14, further comprising displaying an output based on the one correlation measurement value.

17. The method of claim 14, wherein the transmitting comprises transmitting the correlation sequence via an optical signal along an optical fiber, and wherein the method further comprises detecting an anomaly along the optical fiber based on the one correlation measurement value.

18. The method of claim 17, further comprising:
embedding the correlation sequence in a data signal; and
converting the data signal to the optical signal.

19. The method of claim 14, wherein the adjusting comprises:
mathematically combining a constant value with the one correlation measurement value thereby providing a combined value;
summing the correlation measurement values thereby providing a sum value; and
summing the combined value and the sum value.

20. The method of claim 14, wherein the adjusting comprises:
receiving a first value and a second value;
determining a difference between the first and second values; and combining a value indicative of the difference with the one correlation measurement value.

21. The method of claim 20, wherein the correlating is performed by a plurality of correlators, wherein the first value is equal to:

$$[1+(J-2)r]/[1+(J-2)r-(J-1)r^2],$$

wherein J is equal to a number of the correlators, wherein r is equal to (−1/N), and wherein N is a bit length of the correlation sequence.

22. The method of claim 21, wherein the second value is equal to:

$$-r/[1+(J-2)r-(J-1)r^2],$$

and wherein the correlation sequence is an M-sequence.

* * * * *